US010206029B2

(12) United States Patent
Song et al.

(10) Patent No.: US 10,206,029 B2
(45) Date of Patent: Feb. 12, 2019

(54) OMNIDIRECTIONAL SPEAKER

(71) Applicant: SAMSUNG ELECTRONICS CO., LTD., Suwon-si (KR)

(72) Inventors: Jang Hun Song, Suwon-si (KR); Jae Seung Kwack, Suwon-si (KR); Woo Sung In, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/199,082

(22) Filed: Jun. 30, 2016

(65) Prior Publication Data

US 2017/0006374 A1    Jan. 5, 2017

(30) Foreign Application Priority Data

Jul. 3, 2015    (KR) ........................ 10-2015-0095407

(51) Int. Cl.
*H04R 1/02* (2006.01)
*H04R 1/26* (2006.01)
*H04R 1/32* (2006.01)
*H04R 1/34* (2006.01)
*H04R 3/12* (2006.01)
*F16H 19/00* (2006.01)
*F16H 35/18* (2006.01)
(Continued)

(52) U.S. Cl.
CPC .......... *H04R 1/323* (2013.01); *F16H 19/001* (2013.01); *F16H 35/18* (2013.01); *G06F 3/0362* (2013.01); *G06F 3/03547* (2013.01); *H04R 1/025* (2013.01); *H04R 1/26* (2013.01); *H04R 1/345* (2013.01); *H04R 3/12* (2013.01); *H04R 29/008* (2013.01); *H04R 2430/01* (2013.01)

(58) Field of Classification Search
CPC .......... H04R 1/025; H04R 1/323; H04R 3/00; G06F 1/169; G06F 1/1622; G06F 1/1679; G06F 1/1681; G06F 3/0362; G06F 3/0428; G06F 3/04883; G06F 3/0416; F16H 19/001; F16H 2007/081; F16H 27/08; F16K 21/04; G05G 9/04792; B66F 3/24
USPC ......... 345/173, 1.3, 184; 715/771, 727, 863; 254/93 H; 359/363, 824
See application file for complete search history.

(56) References Cited

U.S. PATENT DOCUMENTS 6,771,582 B1    8/2004    Hori
9,304,736 B1 *  4/2016    Whiteley ......... G06Q 20/40145
(Continued)

FOREIGN PATENT DOCUMENTS

| CN | 2935385 Y | 8/2007 |
| KR | 10-2005-0019356 A | 3/2005 |
| WO | 2015/031002 A1 | 3/2015 |

OTHER PUBLICATIONS

International Search Report (PCT/ISA/210) dated Oct. 11, 2016 issued by the International Searching Authority in counterpart International Application No. PCT/KR2016/007055.

*Primary Examiner* — Yogeshkumar Patel
(74) *Attorney, Agent, or Firm* — Sughrue Mion, PLLC

(57) ABSTRACT

An omnidirectional speaker includes a speaker module configured to generate sound, a main body having a circular cross section and configured to accommodate the speaker module, and a control panel configured to cover an upper side of the main body and allow a user to select an operation. The control panel includes a display for displaying a state of the operation and a touch unit configured to receive an input of the user as a touch input.

17 Claims, 13 Drawing Sheets

(51) Int. Cl.
*H04R 29/00* (2006.01)
*G06F 3/0354* (2013.01)
*G06F 3/0362* (2013.01)

(56) References Cited

U.S. PATENT DOCUMENTS

| | | | |
|---|---|---|---|
| 2002/0076062 A1* | 6/2002 | Juszkiewicz | H04R 1/2842 381/89 |
| 2004/0196999 A1 | 10/2004 | Han et al. | |
| 2006/0071918 A1* | 4/2006 | Mori | G06F 1/1626 345/184 |
| 2009/0058687 A1* | 3/2009 | Rothkopf | G06F 3/03547 341/20 |
| 2009/0173925 A1* | 7/2009 | Turner | B66F 3/24 254/93 H |
| 2013/0285922 A1* | 10/2013 | Alberth, Jr. | G06F 1/1694 345/173 |
| 2015/0152958 A1* | 6/2015 | Watanabe | F16H 59/08 74/473.12 |

* cited by examiner

OMNIDIRECTIONAL SPEAKER

CROSS-REFERENCE TO RELATED APPLICATION

This application claims priority from Korean Patent Application No. 10-2015-0095407, filed on Jul. 3, 2015 in the Korean Intellectual Property Office, the disclosure of which is incorporated herein by reference in its entirety.

BACKGROUND

1. Field

Apparatuses consistent with exemplary embodiments relate to an omnidirectional speaker having a control panel for selecting an operation.

2. Description of the Related Art

A speaker, which is an apparatus that receives signals and generates sound, includes a speaker module which outputs the sound.

Recently, an omnidirectional speaker in which sound is not output toward a specific direction but is output by being evenly distributed in all directions has been proposed.

SUMMARY

One or more exemplary embodiments may provide an omnidirectional speaker having a control panel.

In accordance with an aspect of an exemplary embodiment, there is provided an omnidirectional speaker including at least one speaker module configured to generate sound, a main body having a circular cross section and configured to accommodate the at least one speaker module therein, and a control panel configured to cover an upper portion of the main body and allow a user to select an operation, wherein the control panel includes a display for displaying a state of the operation and a touch unit configured to receive an input of the user in a touch method.

The at least one speaker module may include a first speaker module configured to generate sound upward, and the main body includes a first guide member which is disposed on an upper side of the first speaker module to be opposite to the first speaker module and guides sound generated from the first speaker module to be radially distributed, and first transmission holes which are provided in an outer circumferential surface thereof and transmit the sound distributed by the first guide member to the outside.

The first speaker module may include a tweeter speaker.

The at least one speaker module may include a second speaker module configured to generate sound downward, and the main body includes a second guide member which is disposed on a lower side of the second speaker module to be opposite to the second speaker module and guides sound generated from the second speaker module to be radially distributed, and a second transmission hole which is provided in an outer circumferential surface thereof and transmits the sound distributed by the second guide member to the outside.

The second speaker module may include a subwoofer speaker.

The display may be formed by a display panel disposed at the control panel, and the touch unit is formed by a touch film disposed at the control panel.

The display panel may include an organic light-emitting diode (OLED) panel.

The display may be provided to be restricted to a part of a central area of the control panel, and the touch unit is provided in a ring shape outside the display in a radial direction.

The display and the touch unit may be formed in the same area.

The control panel may be installed in the first guide member to be forwardly and reversely rotatable.

The control panel may include a stopper configured to protrude downward, and the first guide member includes a pair of locking jaws which are disposed separately from each other in a circumferential direction with the stopper disposed therebetween.

The speaker may further include a rotation guide unit configured to guide rotation of the control panel.

The control panel may include a rotation shaft configured to protrude from a center of the control panel to a lower side thereof, the rotation guide unit includes a support bracket fixedly installed and configured to rotatably support the rotation shaft, and the support bracket includes a shaft installation hole in which the rotation shaft is rotatably installed.

The rotation guide unit may include a rotation guide fixed to the control panel, and a fixed guide fixed to the support bracket and configured to guide the rotation of the control panel with the rotation guide.

The rotation guide may include a rotation bracket formed to have a ring shape and fixed to the control panel, and a plurality of rotation guide rails disposed at an edge side of a lower surface of the rotation bracket to be spaced apart from each other, and the fixed guide includes a fixed bracket formed to have a ring shape and fixed to the support bracket, and a plurality of fixed guide rails disposed at an edge side of an upper surface of the fixed bracket to be spaced apart from each other with the rotation guide rails installed to be movable in a circumferential direction.

The rotation guide may include a plurality of rotation magnets disposed separately from each other in a circumferential direction, and the fixed guide includes a plurality of fixed magnets disposed separately from each other in a circumferential direction and disposed at positions corresponding to the plurality of rotation magnets.

The rotation guide unit may include a shaft gear coupled to the rotation shaft and rotatably installed in the shaft installation hole, a torsion spring configured to elastically support the shaft gear in a circumferential direction, and a reduction gear interlocked with the shaft gear.

The rotation guide unit may further include a gear cover installed at the support bracket and configured to cover the shaft gear and the reduction gear, the torsion spring includes an elastic unit, which is formed to have a spiral shape with a shaft of the shaft gear installed therein to pass therethrough, and a pair of legs configured to extend from the elastic unit, the shaft gear includes a pair of rotation support units which are spaced apart from each other in a circumferential direction and support the pair of legs at a position adjacent to the elastic unit, and the gear cover includes a pair of fixed support units configured to support the pair of legs at positions adjacent to ends of the legs.

The control panel may include a display panel configured to form the display, a panel board configured to control the display panel, and a pinion rotatably installed in the panel board, and the support bracket includes a rack, which is provided at an outside to be spaced apart from the shaft installation hole in a radial direction and extends in a circumferential direction to be interlocked with the pinion.

BRIEF DESCRIPTION OF THE DRAWINGS

The above and/or other aspects will become more apparent by describing certain exemplary embodiments with reference to the accompanying drawings, in which.

DETAILED DESCRIPTION

Figure 1:
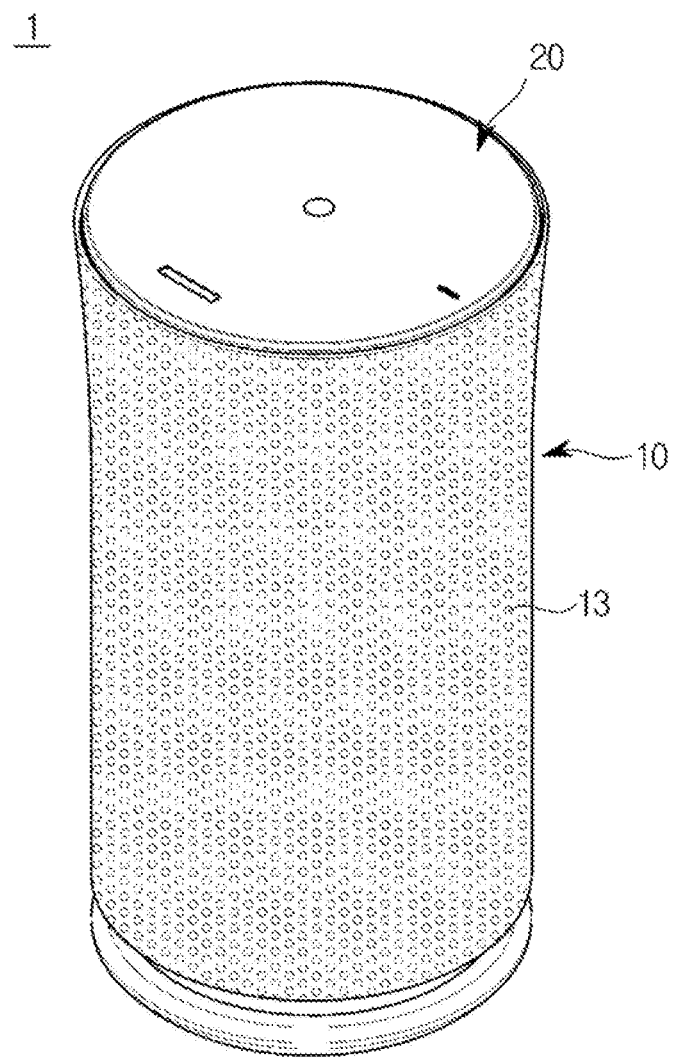
FIG. 1 is a perspective view of an omnidirectional speaker according to an exemplary embodiment.

Certain exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

Figure 2:
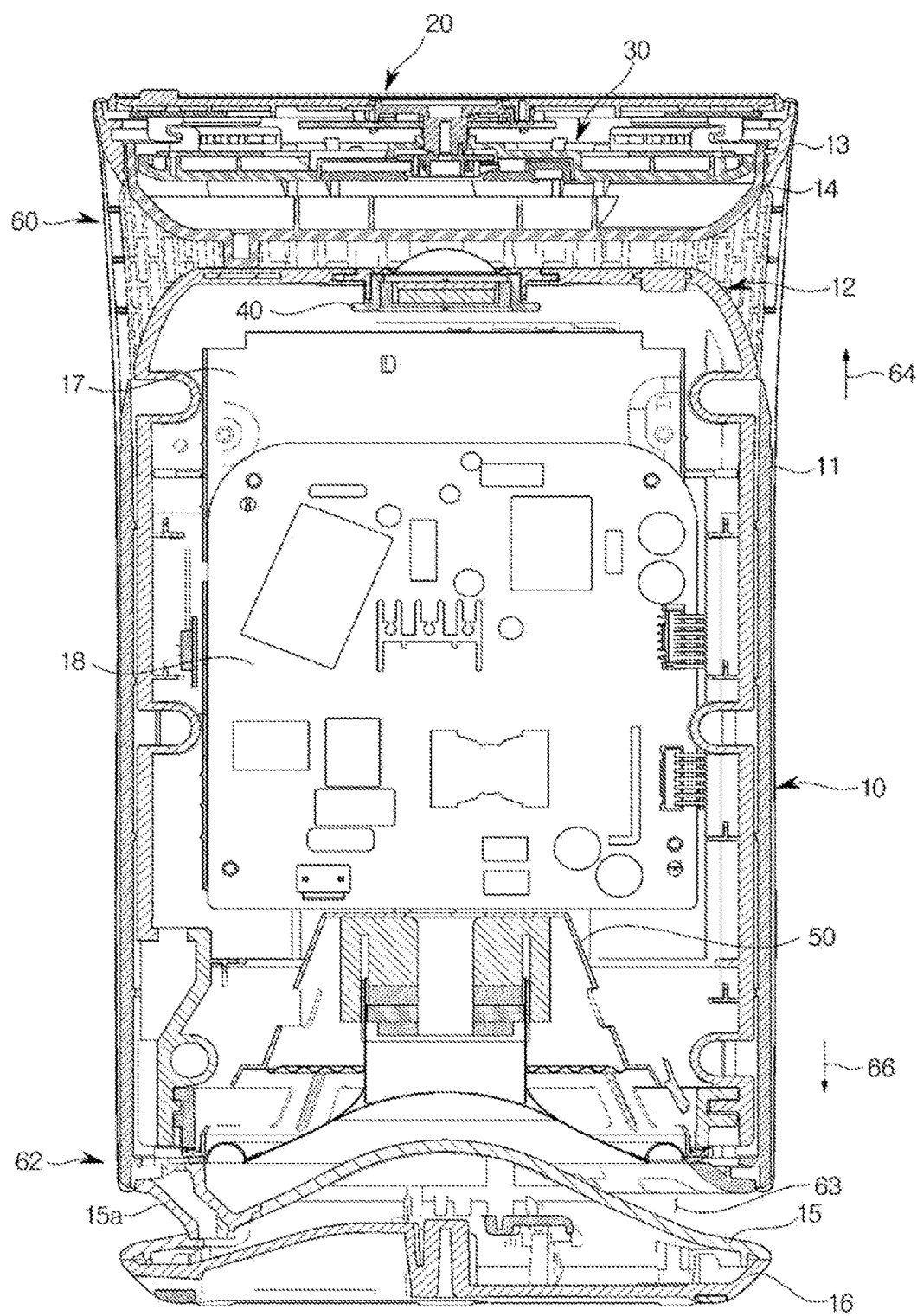
FIG. 2 is a cross-sectional view of the omnidirectional speaker according to an exemplary embodiment.

As illustrated in FIGS. 1 and 2, an omnidirectional speaker 1 is a speaker in which the generated sound is distributed evenly in all directions, and includes first and second speaker modules 40 and 50 which receive electrical signals and output sound, a main body 10 which forms an exterior of the omnidirectional speaker 1 and accommodates the first and second speaker modules 40 and 50, and a control panel 20, which is installed on an upper portion 60 of the main body 10, forms an upper surface of the omnidirectional speaker 1, and allows a user to select an operation of the omnidirectional speaker 1.

Since the main body 10 is formed to have a circular cross section and the control panel 20 is installed on an upper portion of the main body 10 as described above, the omnidirectional speaker 1 may be easily used by a user by using the control panel 20 provided on the upper surface of the omnidirectional speaker 1 while having an integral body due to having the same exterior viewed from all directions.

The first speaker module 40 is accommodated in the upper portion of the main body 10 and outputs sound in an upward direction 64. The second speaker module 50 is accommodated in a lower portion 62 of the main body 10 and outputs sound in a downward direction 66. In an exemplary embodiment, the first speaker module 40 includes a tweeter speaker for generating a high-pitched tone, and the second speaker module 50 includes a subwoofer speaker for generating a low-pitched tone.

Since the omnidirectional speaker 1 is a speaker that may evenly spread sound in all directions, the main body 10 is formed to have a circular cross section so that the sound generated therein is distributed and transmitted evenly in all directions. In an exemplary embodiment, the main body 10 vertically extends to form a substantially cylindrical shape. The main body 10 includes an outer case 11 which forms an outer frame, an inner case 12, which is disposed in the outer case 11 and supports the internal components including the first and second speaker modules 40 and 50, and a cover mesh 13 which is formed of a fabric and is disposed to cover an outer circumferential surface of the outer case 11.

The outer case 11 is formed to have a hollow cylindrical shape. Through-holes 11a, i.e., first transmission holes shown in FIG. 4, may transmit the generated sound to the outside and are provided in an upper portion of the outer case 11. An upper surface and a lower surface of the outer case 11 are open.

A first guide member 14 which is installed to cover an open upper end of the outer case 11 is installed in the upper portion of the outer case 11, and a second guide member 15 which is installed separately from an open lower end of the outer case 11 is installed underneath the outer case 11.

The first guide member 14 radially guides sound which is output upward from the first speaker module 40 by being installed above the first speaker module 40 to be opposite to the first speaker module 40, and outputs the sound to the outside through the through-holes 11a.

The second guide member 15 is formed to have a substantially conical shape, radially guides sound which is output downward from the second speaker module 50 by being installed under the second speaker module 50 to be opposite to the second speaker module 50, and outputs the sound to the outside through a space 63, e.g., a second transmission hole, between the lower end of the outer case 11 and the second guide member 15.

In an exemplary embodiment, the second guide member 15 includes a plurality of legs 15a which are spaced apart from each other in a circumferential direction. Upper ends of the legs 15a are connected to a lower end of the inner case 12, and thus a state in which the lower end of the outer case 11 is spaced apart from the second guide member 15 may be maintained.

Further, a supporting member 16 which allows the omnidirectional speaker 1 to stand on a horizontal surface by being supported by the horizontal surface is coupled to a lower portion of the second guide member 15. Terminals which transmit power or electrical signals are provided in the supporting member 16.

The inner case 12 is formed to have a substantially hollow cylindrical shape, the first speaker module 40 is fixed to a center portion of an upper surface of the inner case 12, and the second speaker module 50 is fixed to the lower end of the inner case 12. The inner case 12 includes a printed circuit board 18 for controlling an operation of the omnidirectional speaker 1, and a board bracket 17, which is fixed in the inner case 12 to fix the printed circuit board 18.

Figure 3:
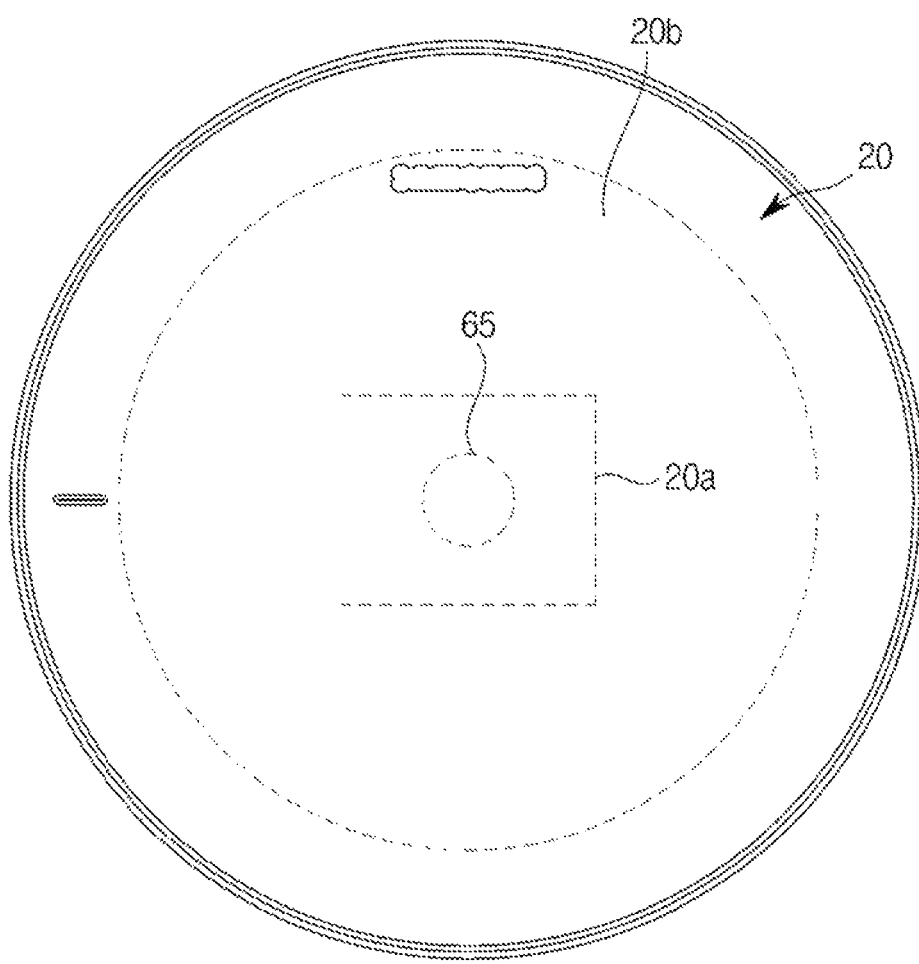
FIG. 3 is a plan view of the omnidirectional speaker according to an exemplary embodiment.

The control panel 20 includes a display 20a which shows an operational state of the omnidirectional speaker 1, and a touch unit 20b which receives a user input in a touch method as illustrated in FIG. 3. The display 20a is provided to be restricted to a central area of the control panel 20, and the touch unit 20b is provided in a substantially ring shape outside the display 20a in a radial direction. In an exemplary embodiment, an icon 65 which represents the operational state of the omnidirectional speaker 1 is displayed on the display 20a.

Figure 4:
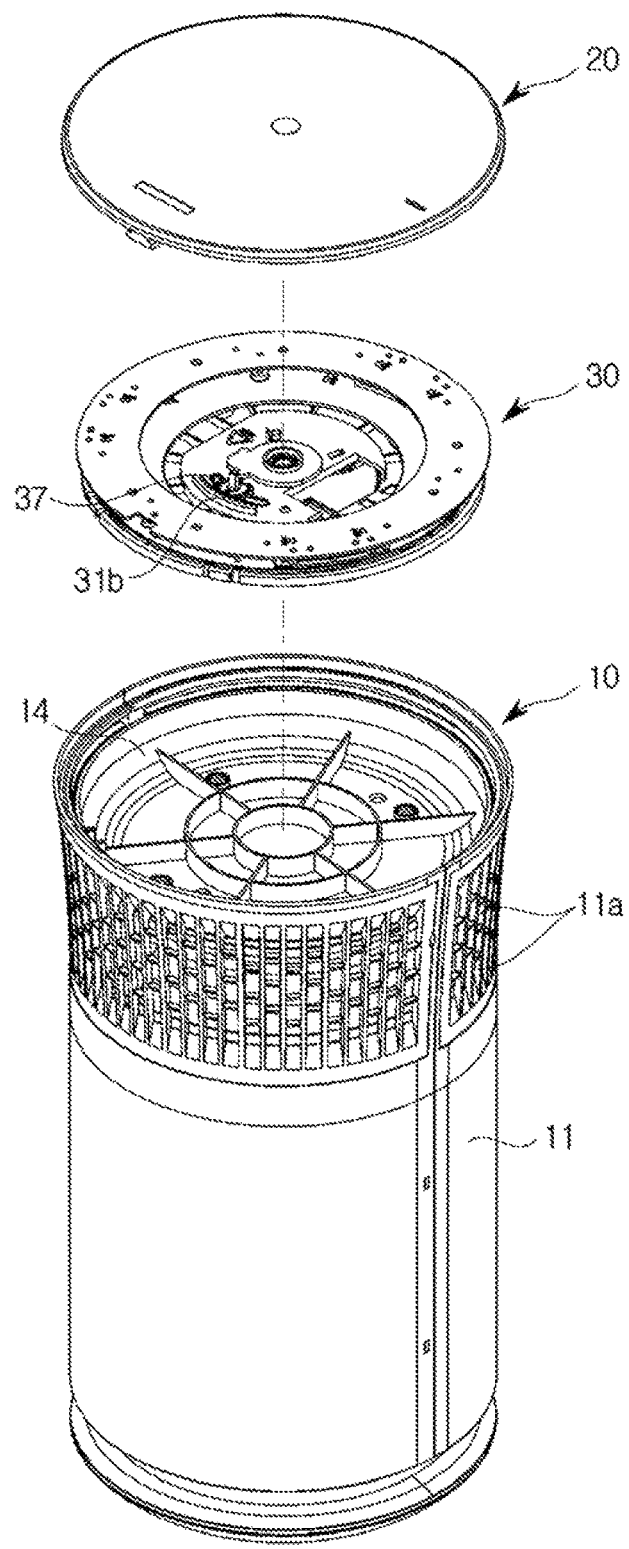
FIG. 4 is an exploded perspective view to show an installing of a control panel and a rotation guide unit at a main body according to an exemplary embodiment.
Figure 5:
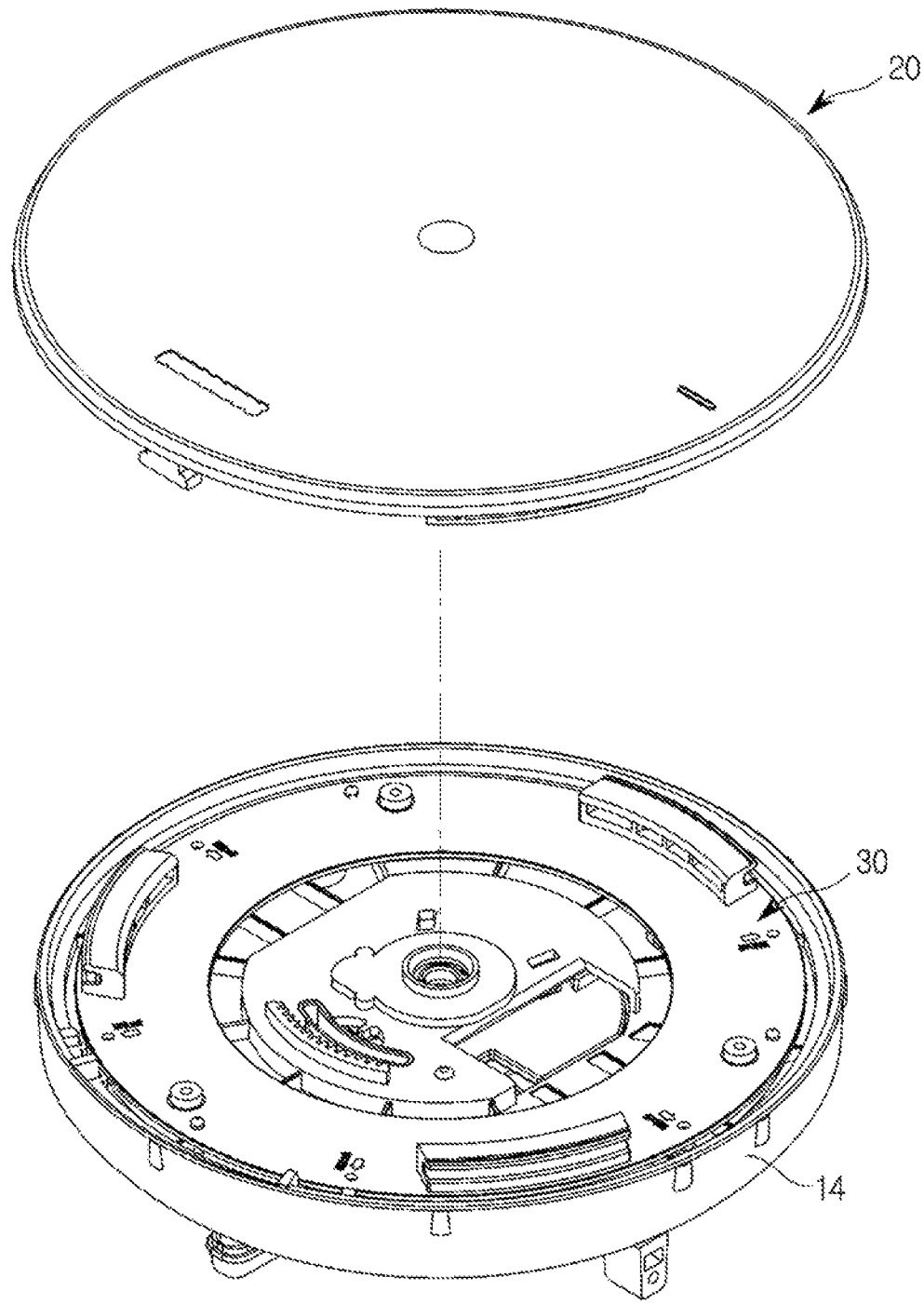
FIG. 5 is an exploded perspective view to show an installing of the control panel at the rotation guide unit according to an exemplary embodiment.
Figure 6:
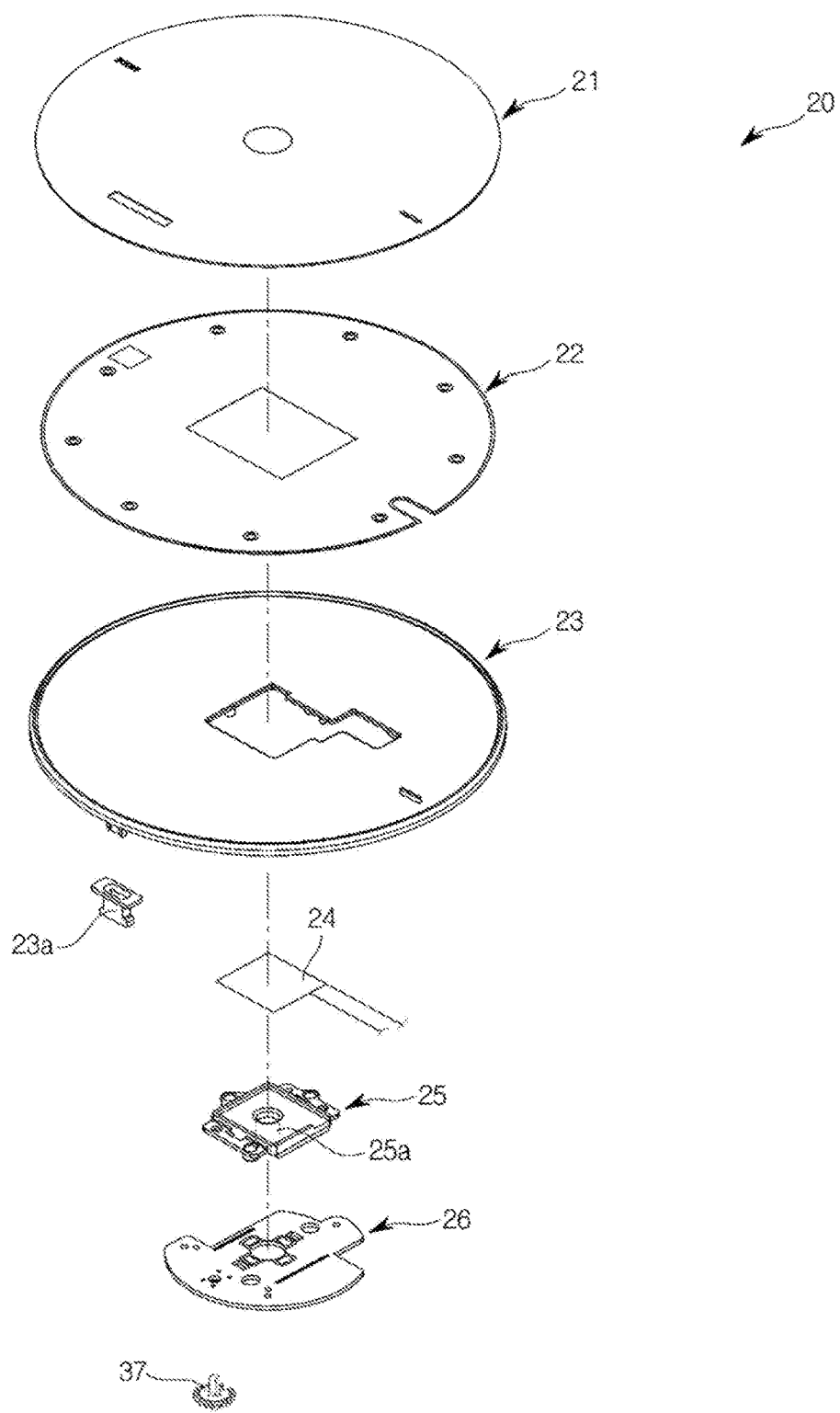
FIG. 6 is an exploded perspective view of the control panel according to an exemplary embodiment.

As illustrated in FIGS. 4 and 5, the control panel 20 is installed on the main body 10 through a rotation guide unit 30 to be described below. As illustrated in FIG. 6, a control panel 20 includes an upper plate 21 which is formed to have a disc shape and forms an exterior of an upper surface of the control panel 20, a touch film 22 which forms the touch unit 20b, a decorative plate 23 which is formed to have a disc shape, a display panel 24 which forms the display 20a, a panel bracket 25 which supports the display panel 24, and a panel board 26 which controls the display panel 24. The touch film 22 is attached to an upper surface of the decorative plate 23.

In an exemplary embodiment, the display panel 24 includes an OLED panel, and is rotatable around a rotation shaft 25a which is rotatably installed in a support bracket 31 to be described below and extends from the center of the panel board 26 to a lower side 67 of the panel board 26 (see FIG. 8).

In an exemplary embodiment, the control panel 20 may be installed in an upper portion 60 of the main body 10 to be rotatable in forward and reverse directions, and may adjust sound output from the omnidirectional speaker 1 while rotating.

The rotation guide unit 30 for guiding the rotation of the control panel 20 is installed in the upper portion 60 of the main body 10. In an exemplary embodiment, the rotation guide unit 30 is accommodated in an upper side of the first guide member 14 as illustrated in FIG. 5.

Figure 7:
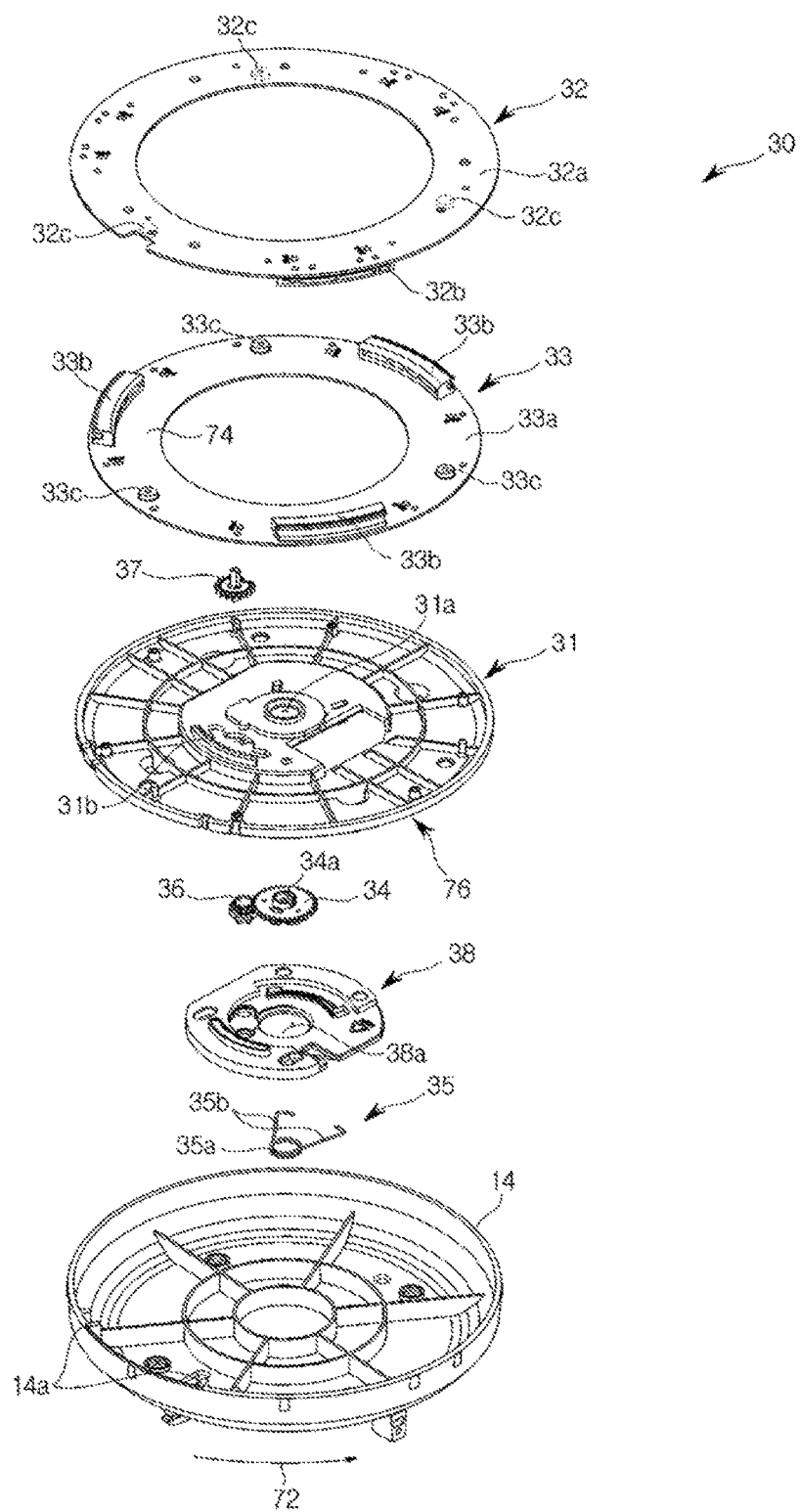
FIG. 7 is a bottom perspective view of the control panel and a perspective view of the rotation guide unit according to an exemplary embodiment.
Figure 8:
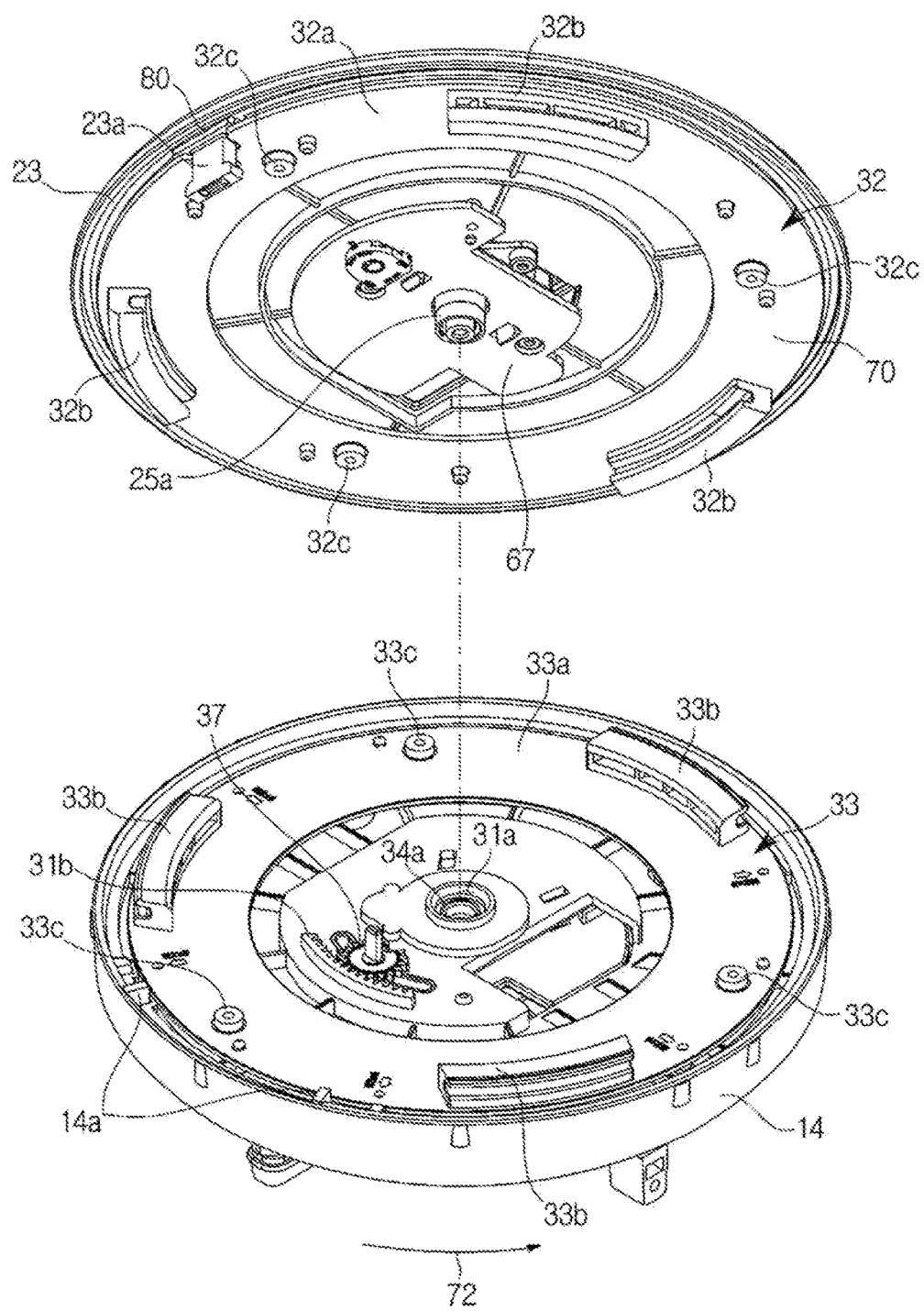
FIG. 8 is an exploded perspective view of the rotation guide unit according to an exemplary embodiment.
Figure 9:
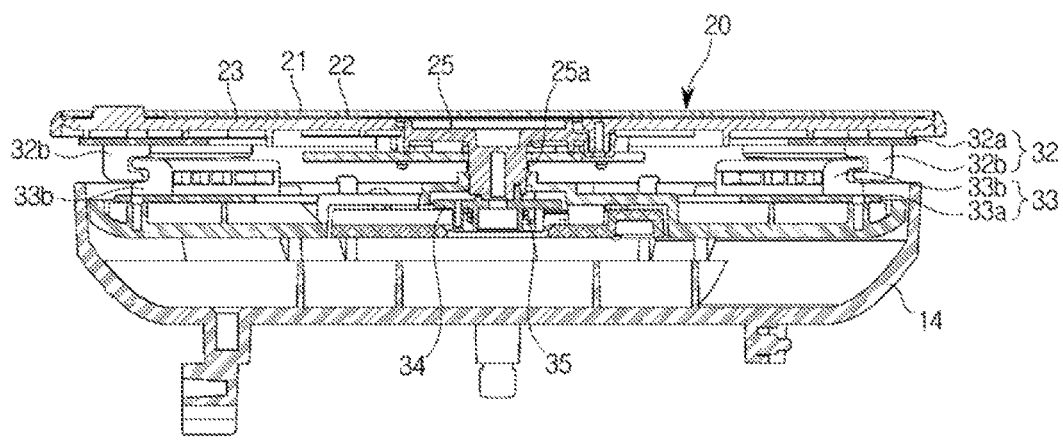
FIG. 9 is a cross-sectional view of the control panel and the rotation guide unit according to an exemplary embodiment.

As illustrated in FIGS. 7, 8, and 9, the rotation guide unit 30 includes the support bracket 31 which is fixedly installed to the upper side of the first guide member 14 and rotatably supports the control panel 20, a rotation guide 32 which is fixedly installed to a lower surface of the control panel 20 and is rotated with the control panel 20, and a fixed guide 33 which is fixedly installed to a fixed bracket 33a, interacts with the rotation guide 32, and guides the rotation of the control panel 20.

The support bracket 31 includes a shaft installation hole 31a in the center portion and the rotation shaft 25a of the control panel 20 is rotatably installed in the shaft installation hole 31a.

The rotation guide 32 includes a rotation bracket 32a formed as a plate having a ring shape, and a plurality of rotation guide rails 32b which are disposed on a lower surface 70 of the rotation bracket 32a to be spaced apart from each other in a circumferential direction 72 of the main body.

The fixed guide 33 includes the fixed bracket 33a which is formed in a ring shape, and a plurality of fixed guide rails 33b which are disposed on an upper surface 74 of the fixed bracket 33a to be spaced apart from each other in the circumferential direction 72 and in which the plurality of rotation guide rails 32b are installed to be movable in the circumferential direction 72.

Therefore, an edge side of the control panel 20 may be prevented from being moved in a vertical direction by the rotation guide rails 32b and the fixed guide rails 33b, and thus the larger control panel 20 may be formed.

In an exemplary embodiment, each of the rotation bracket 32a and the fixed bracket 33a is formed of a metal material to have sufficient strength, and each of the rotation guide rails 32b and the fixed guide rails 33b is formed of a resin having a low coefficient of friction so that the rotation guide rail 32b is easily moved in the circumferential direction 72.

Further, the rotation guide 32 includes a plurality of rotation magnets 32c which are disposed on the lower surface 70 of the rotation bracket 32a to be spaced apart from each other in the circumferential direction 72, and the fixed guide 33 includes a plurality of fixed magnets 33c which are disposed on the upper surface 74 of the fixed bracket 33a to be spaced apart from each other in the circumferential direction 72 and which are disposed at positions corresponding to the plurality of rotation magnets 32c.

An attractive force is generated between the rotation magnets 32c and the fixed magnets 33c. Therefore, the control panel 20 may be maintained in a state of being located at a predetermined position until an external force is applied. Further, when the control panel 20 is rotated in one direction and is returned to a reference position, the control panel 20 may be returned to a correct position by the attractive force that acts between the rotation magnets 32c and the fixed magnets 33c.

In an exemplary embodiment, the control panel 20 is rotated in one direction, is rotated automatically in the opposite direction, and thus is returned to the reference position.

For example, the rotation guide unit 30 includes a shaft gear 34 which is coupled to the rotation shaft 25a and is rotatably installed in the shaft installation hole 31a, a torsion spring 35 which elastically supports the shaft gear 34 in the circumferential direction 72 and allows the shaft gear 34 rotated in one direction and the control panel 20 connected to the shaft gear 34 to be returned to the reference position, and a reduction gear 36 interlocked with the shaft gear 34. A gear cover 38 which houses the shaft gear 34 inserted through an opening 38a, the reduction gear 36, and the torsion spring 35 is fixed to a lower surface 76 of the support bracket 31.

The torsion spring 35 includes an elastic unit 35a which is formed to have a spiral shape and in which a shaft 34a of the shaft gear 34 is installed to pass therethrough, and a pair of legs 35b which extend from the elastic unit 35a.

Figure 10:
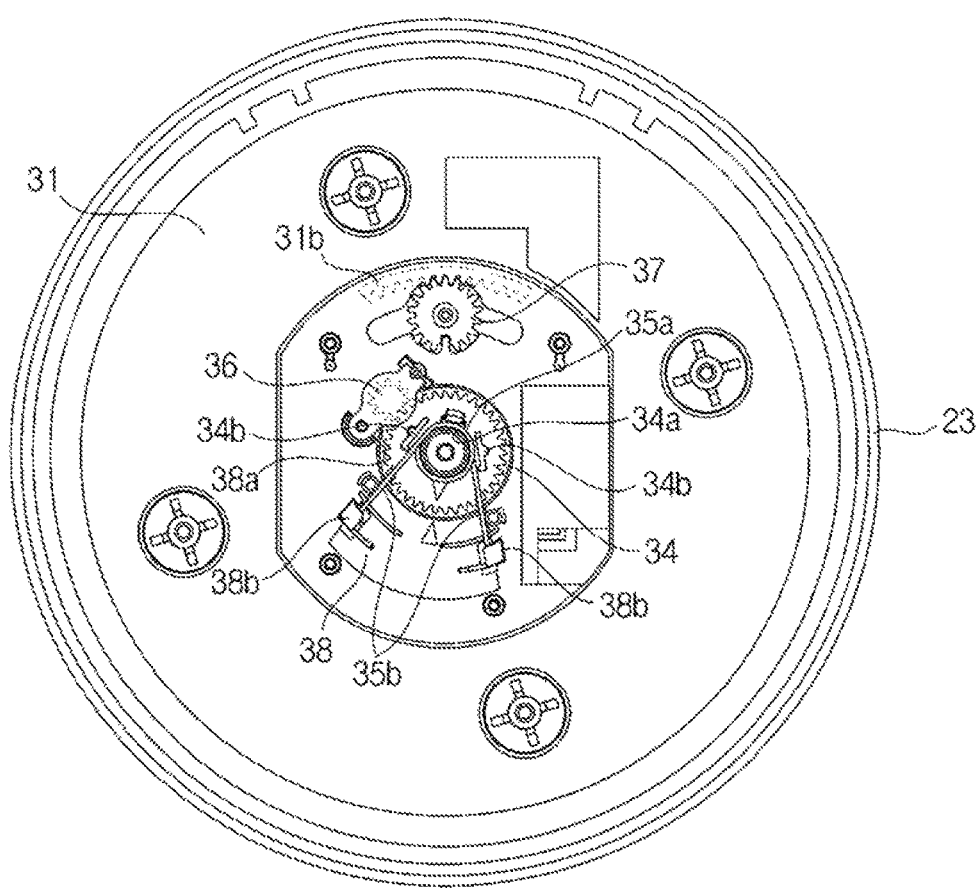
FIGS. 10 and 11 are bottom views of motions of the rotation guide unit according to an exemplary embodiment.

As shown in FIG. 10, the shaft gear 34 includes a pair of rotation support units 34b which are disposed separately from each other in a circumferential direction 72 and each support portions adjacent to the shaft 34a of the shaft gear 34, and the gear cover 38 includes a pair of fixed support units 38b which support the legs 35b at portions adjacent to ends of the legs 35b.

Figure 11:
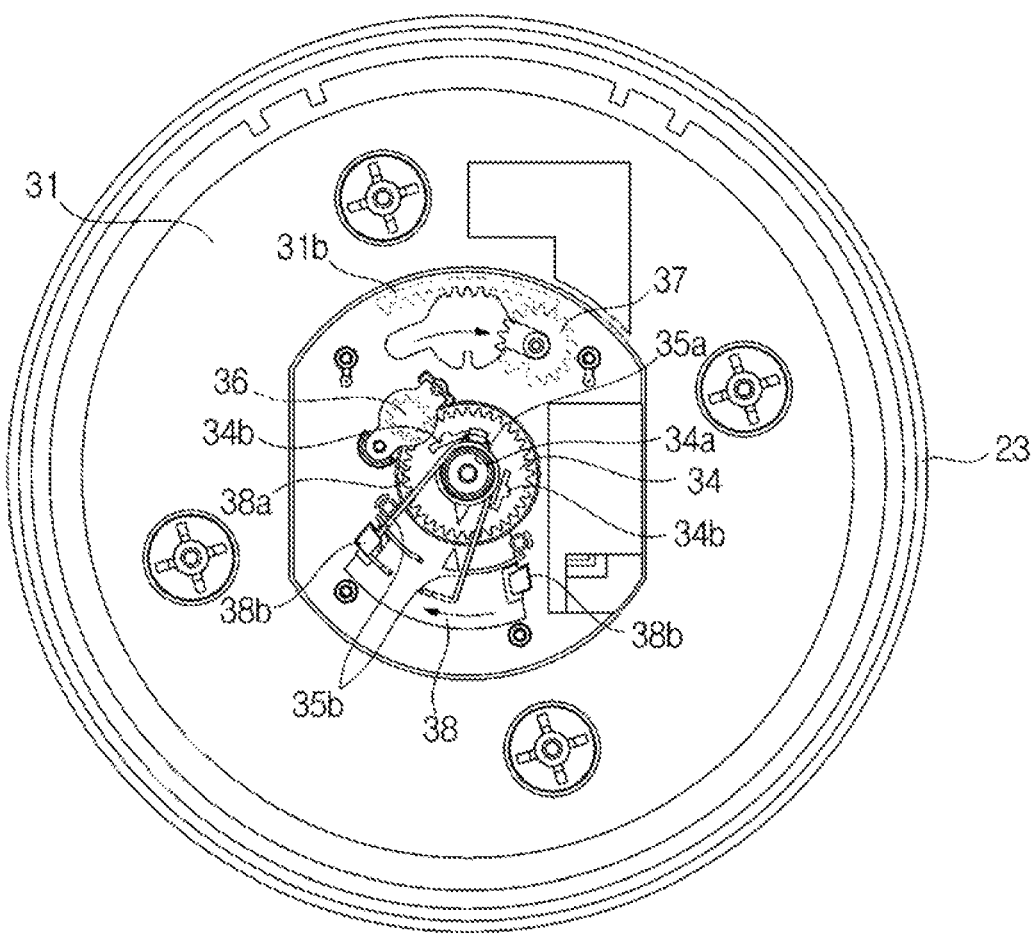

Therefore, when the shaft gear 34 rotates in one direction according to the rotation of the control panel 20, a one-side rotation support unit 34b among the two rotation support units 34b provided in the shaft gear 34 pushes a one-side leg 35b, allows the one-side leg 35b to be rotated in the one direction as illustrated in FIG. 11, and thus the elastic unit 35a is elastically deformed.

The control panel 20 limits rotation within a predetermined range.

For example, the control panel 20 includes a stopper 23a which is installed to protrude downward from a lower surface of an edge side 80 of the decorative plate 23 as illustrated in FIGS. 6 and 8, and the first guide member 14 includes a pair of locking jaws 14*a* which are disposed separately from each other in a circumferential direction 72. In a state in which the control panel 20 is installed on the main body 10, the stopper 23*a* is installed to be located between the pair of locking jaws 14*a*.

Therefore, since the control panel 20 is engaged with one of the two locking jaws 14*a* when the control panel 20 is rotated from the reference position at a predetermined angle or more in a forward or reverse direction, a rotation angle of the control panel 20 is limited to the predetermined angle or less.

When an external force applied by a user is released, the elastic unit 35*a* is elastically restored and pushes the one-side rotation support unit 34*b* while the legs 35*b* are returned to the reference position, the shaft gear 34 is rotated in a direction opposite to a previous rotation direction, and thus the control panel 20 is returned to the reference position. In this case, the control panel 20 is accurately returned to the reference position by the attractive force that acts between the rotation magnets 32*c* and the fixed magnets 33*c* as described above.

As shown in FIGS. 4 and 6-8, the rotation guide unit 30 includes a pinion 37, which is rotatably installed in the panel board 26 in order to detect the rotation angle of the control panel 20, and a rack 31*b*, which is provided in the upper surface of the support bracket 31, extends in a circumferential direction 72, and is interlocked with the pinion 37. The pinion 37 is rotatably installed at a position which is eccentric from the shaft installation hole 31*a*. Further, although not illustrated in the drawings, a switch which detects a rotation angle of the pinion 37 is disposed at a lower surface of the panel board 26.

Therefore, when a user rotates the control panel 20 by applying an external force, the pinion 37 is moved with respect to the center of the shaft installation hole 31*a* in a circumferential direction 72 according to the rotation of the control panel 20. Since the pinion 37 is in a state of being interlocked with the rack 31*b* as described above, the pinion 37 is moved in the circumferential direction 72 and is rotated at the same time. Since the rotation angle of the pinion 37 is changed to an electrical signal through the switch provided in the panel board 26, the rotation angle of the control panel 20 is confirmed through the electrical signal.

In an exemplary embodiment, although the main body 10 is formed to have a substantially cylindrical shape, an exemplary embodiment is not limited thereto, and the main body may be formed to have various shapes while having a circular cross section. However, since the control panel is disposed on the upper portion of the main body as described above, the upper portion of the main body may be formed to have a diameter of a predetermined size or more. That is, the main body may be formed to have a truncated conical shape, a vertically inverted truncated conical shape, a shape of which an outer surface is vertically curved like a jar, or the like.

In an exemplary embodiment, although the control panel 20 may be rotatably installed in the upper portion of the main body 10 and may rotate and adjust a volume of sound output from the omnidirectional speaker 1, an exemplary embodiment is not limited thereto, and the control panel 20 may adjust the volume of the sound through the touch unit 20*b*.

Further, other various operations such as changing of a mode in addition to a volume of the speaker may be selected according to the rotation of the control panel 20.

Figure 12:
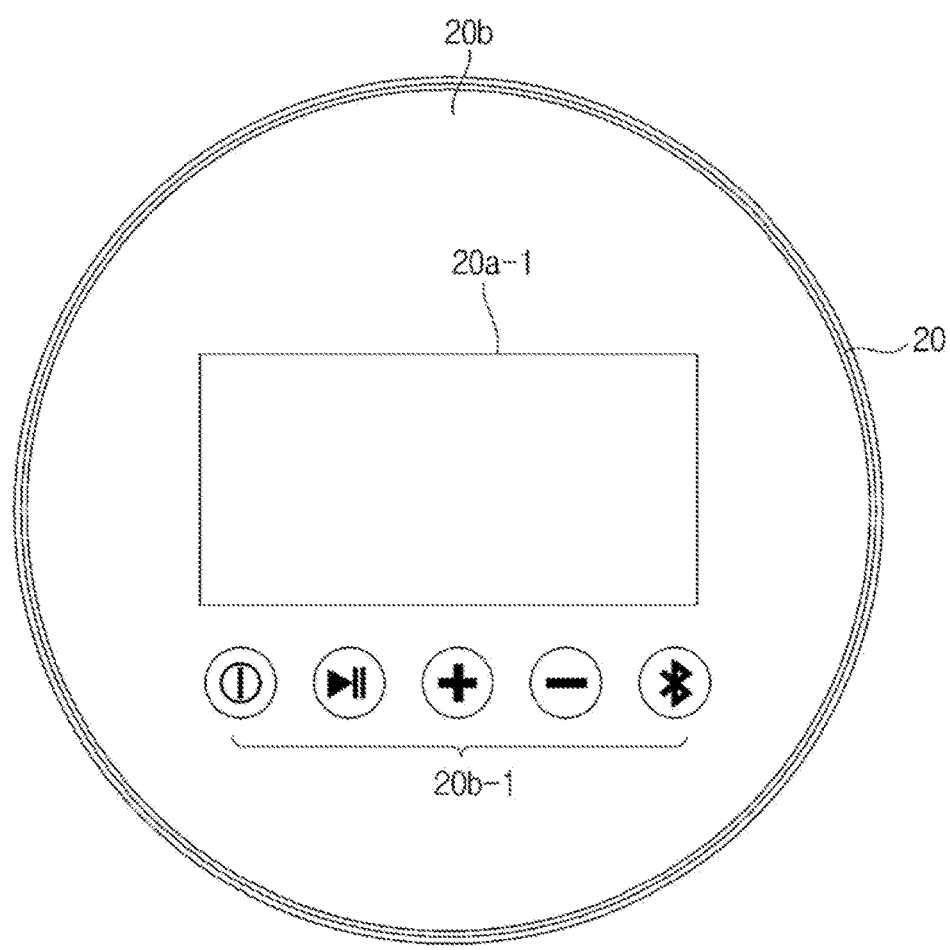
FIG. 12 is a plan view of a control panel according to another embodiment of the present disclosure.

Further, in an exemplary embodiment, although the operation of the omnidirectional speaker 1 is selected by the touch unit 20*b* provided in the control panel 20, an exemplary embodiment is not limited thereto, and the operation of the omnidirectional speaker 1 may be selected by a display 20*a*-1 and buttons 20*b*-1 by forming the display 20*a*-1 having a rectangular shape and the buttons 20*b*-1 for selecting a function in a control panel 20 as illustrated in FIG. 12.

Figure 13:
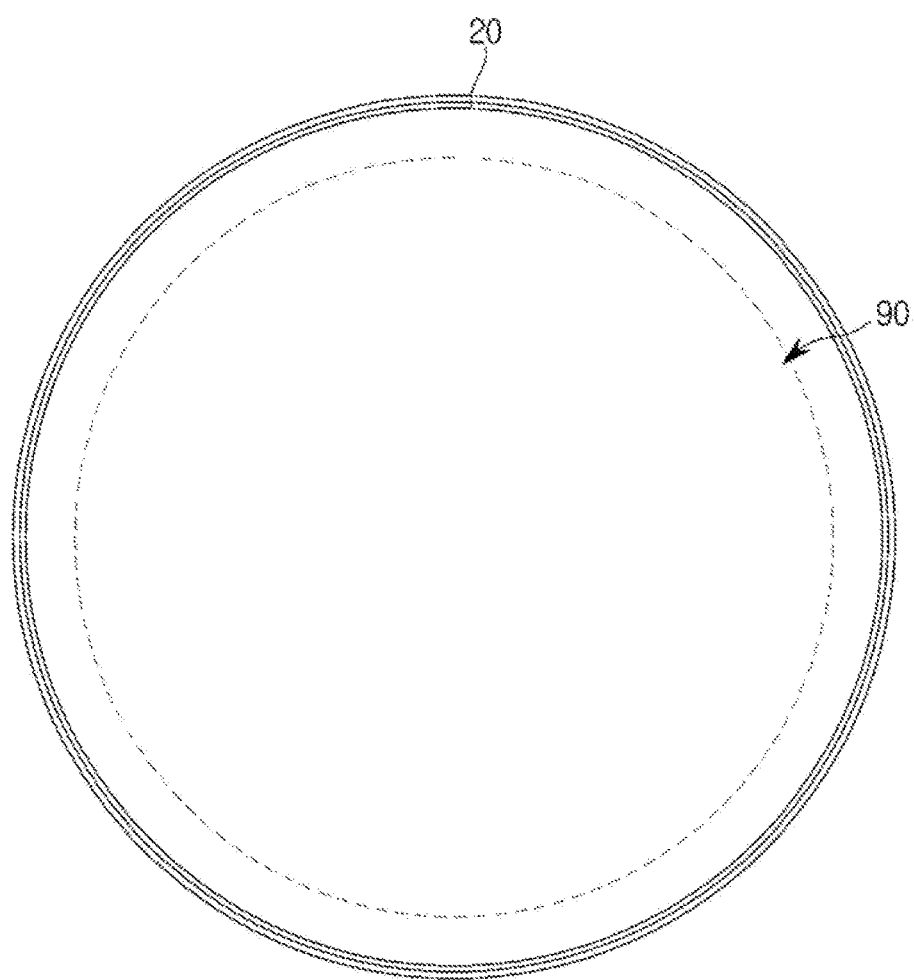
FIG. 13 is a plan view of a control panel according to another embodiment of the present disclosure.

Further, in an exemplary embodiment, although the display 20*a* and the touch unit 20*b* are described above as being formed in the different or separate areas of the control panel 20, an exemplary embodiment is not limited thereto, and a display 20*a* and a touch unit 20*b* may be formed in the same area as illustrated in FIG. 13 by being disposed so that a display panel and a touch film having the same size are vertically stacked to form a user interface 90.

In an exemplary embodiment, although the operational state of the omnidirectional speaker 1 may be displayed through the display 20*a* by providing the display 20*a* in the control panel 20, an exemplary embodiment is not limited thereto, and an LED may be disposed at the control panel 20 and a user may recognize the operational state of the omnidirectional speaker 1 through a change of a color of light generated in the LED or a flashing of the light.

As described above, according to an aspect of an exemplary embodiment, in the omnidirectional speaker, since a control panel having a disc shape is provided above a main body having a circular cross section, the omnidirectional speaker can be easily used through the control panel provided in the upper surface of the omnidirectional speaker while having unity due to having the same shape in all directions.

Further, in the omnidirectional speaker, the control panel is installed above the main body to be forwardly and reversely rotatable, and thus an operation of the omnidirectional speaker can be selected by the rotation of the control panel.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An omnidirectional speaker comprising:
   at least one speaker module configured to generate sound;
   a main body having a circular cross section and configured to accommodate the at least one speaker module; and
   a control panel which is configured to cover an upper side of the main body, to allow a user to select an operation, to be rotated in one direction, and to be automatically returned to a reference position, the control panel including a display for displaying a state of the operation and a touch film configured to receive a touch input of the user; and
   a rotation guide assembly configured to guide a rotation of the control panel,
   wherein the control panel includes a rotation shaft which is disposed at a center of the control panel and is protruded from the control panel to a lower side of the control panel,
   wherein the rotation guide assembly unit includes:
   a support bracket configured to rotatably support the rotation shaft, a rotation guide fixed to a lower surface of the control panel, and a fixed guide fixed to the support bracket to face the rotation guide and configured to guide the rotation of the control panel by interacting with the rotation guide, wherein the rotation guide includes a rotation guide rail movable in a circumferential direction of the main body, wherein the fixed guide includes a fixed guide rail, and wherein the rotation guide rail is movable coupled to the fixed guide rail in the circumferential direction.

2. The omnidirectional speaker according to claim 1, wherein the at least one speaker module includes a first speaker module configured to generate the sound in an upward direction toward the upper side of the main body, and the main body includes:

a first guide member, which is disposed on an upper side of the first speaker module as seen in the upward direction, and configured to guide the sound generated by the first speaker module to be radially distributed; and first transmission holes which are provided in an outer circumferential surface of the main body and configured to transmit the sound distributed by the first guide member to an outside of the main body.

3. The omnidirectional speaker according to claim 2, wherein the first speaker module includes a tweeter speaker.

4. The omnidirectional speaker according to claim 1, wherein the at least one speaker module includes a second speaker module configured to generate the sound in a downward direction with respect to the upper side of the main body, and the main body includes:

a second guide member, which is disposed on a lower side of the second speaker module as seen in the downward direction, and configured to guide the sound generated by the second speaker module to be radially distributed; and a second transmission hole which is provided in an outer circumferential surface of the main body, and configured to transmit the sound distributed by the second guide member to an outside of the main body.

5. The omnidirectional speaker according to claim 4, wherein the second speaker module includes a subwoofer speaker.

6. The omnidirectional speaker according to claim 1 wherein the display includes an organic light-emitting diode display panel.

7. The omnidirectional speaker according to claim 1, wherein:

the display is disposed on a part of a central area of the control panel; and the touch film is provided in a ring shape extending outside the display in a radial direction of the control panel.

8. The omnidirectional speaker according to claim 1, wherein the display and the touch film are formed in the same area.

9. The omnidirectional speaker according to claim 2, wherein the control panel is installed in the first guide member.

10. The omnidirectional speaker according to claim 9, wherein:

the control panel includes a stopper configured to protrude downward with respect to the upper side of the main body; and the first guide member includes a pair of locking jaws which are disposed separately from each other in the circumferential direction of the main body and the stopper is disposed between of the pair of locking jaws.

11. The omnidirectional speaker according to claim 9, wherein:

the support bracket is fixed to the first guide member and includes a shaft installation hole in which the rotation shaft is rotatably installed.

12. The omnidirectional speaker according to claim 11, wherein:

the fixed guide rail is one of a plurality of fixed guide rails, the rotation guide rail is one of a plurality of rotation guide rails, the rotation guide includes a rotation bracket formed as a ring and fixed to the control panel, the plurality of rotation guide rails are disposed at an outer edge area of a lower surface of the rotation bracket to be spaced apart from each other in the circumferential direction of the main body, the fixed guide includes a fixed bracket formed to have a ring shape and fixed to the support bracket, the plurality of fixed guide rails are disposed at an outer edge area of an upper surface of the fixed bracket to be spaced apart from each other in the circumferential direction; and the plurality of rotation guide rails is installed into spaces between the plurality of fixed guide rails to be movable in the circumferential direction, between the plurality of fixed guide rails.

13. The omnidirectional speaker according to claim 11, wherein:

the rotation guide includes a plurality of rotation magnets disposed on a lower surface of the rotation guide separately from each other in the circumferential direction of the main body; and the fixed guide includes a plurality of fixed magnets disposed on an upper surface of the fixed guide separately from each other in the circumferential direction at positions corresponding to positions of the plurality of rotation magnets.

14. The omnidirectional speaker according to claim 11, wherein the rotation guide assembly further includes:

a shaft gear coupled to the rotation shaft and rotatably installed in the shaft installation hole;

a torsion spring configured to elastically support the shaft gear in the circumferential direction of the main body; and a reduction gear interlocked with the shaft gear, wherein the torsion spring is configured to elastically support the shaft gear in the circumferential direction of the main body.

15. The omnidirectional speaker according to claim 14, wherein:

the rotation guide assembly further includes a gear cover installed at the support bracket and configured to cover the shaft gear and the reduction gear;

the torsion spring includes a spiral elastic member and two legs extending from the spiral elastic member, the shaft gear is installed to pass through the spiral elastic member;

the shaft gear includes a pair of rotation support members which are spaced apart from each other in the circumferential direction and support the two legs at a position adjacent to the spiral elastic member; and the gear cover includes a pair of fixed support members configured to support the two legs at positions adjacent to ends of the two legs, respectively.

16. The omnidirectional speaker according to claim 11, wherein:
   the control panel further includes a panel board configured to control the display, and a pinion rotatably installed in the panel board; and
   the support bracket includes a rack, which is provided to be spaced apart from the shaft installation hole in a radial direction of the control panel and extends in the circumferential direction of the main body, to be interlocked with the pinion.

17. The omnidirectional speaker according to claim 1, wherein the rotation guide includes a first plurality of magnets disposed on a lower surface of the rotation guide separately from each other in the circumferential direction of the main body, and
   wherein the fixed guide includes a second plurality of magnets disposed on an upper surface of the fixed guide separately from each other in the circumferential direction at positions corresponding to positions of the first plurality of magnets until an external force is applied to rotate the control panel in the one direction,
   wherein the control panel is further configured to be returned to the reference position by a magnetic force that acts between the first plurality of magnets and the second plurality of magnets that have been displaced from their positions by the external force.

* * * * *